Feb. 25, 1964     W. A. TAYLOR, SR     3,122,111
IMPLEMENT FOR SOD SEEDING

Filed Sept. 8, 1960                       2 Sheets-Sheet 1

INVENTOR.
WILLIAM A. TAYLOR, SR.
BY John R. Walker, III
Attorney

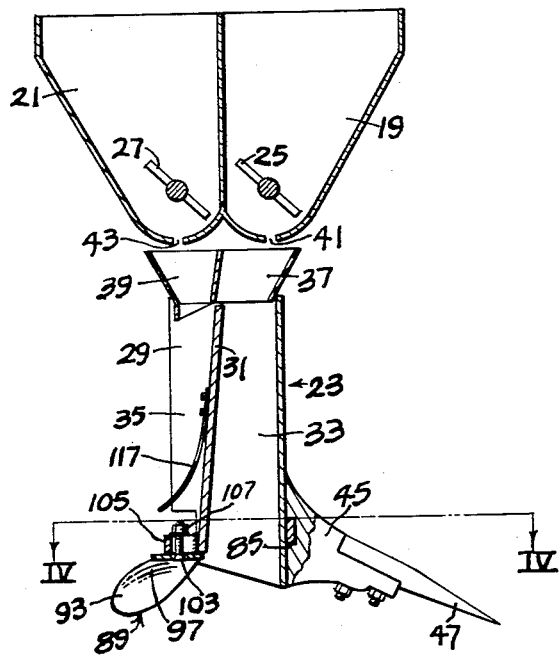
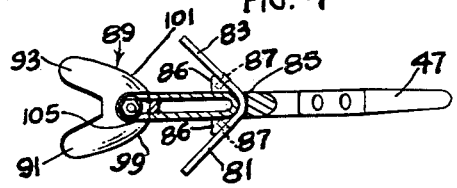
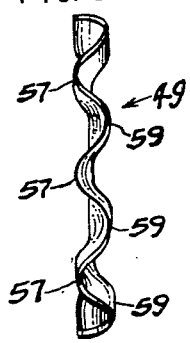
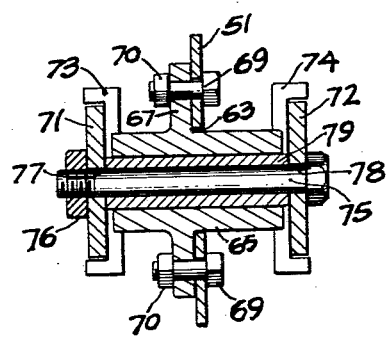
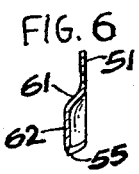
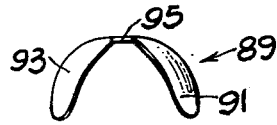

United States Patent Office 3,122,111
Patented Feb. 25, 1964

3,122,111
IMPLEMENT FOR SOD SEEDING
William A. Taylor, Sr., Louisville, Miss., assignor to Taylor Machine Works, Louisville, Miss.
Filed Sept. 8, 1960, Ser. No. 54,773
6 Claims. (Cl. 111—89)

This invention relates to an agricultural implement adapted for that type of planting or seeding known as sod seeding, which is characterized by the planting of seeds and placement of fertilizer in existing sods without previous preparation.

One of the biggest problems encountered with previous sod seeders was the formation of so-called air pockets, in which case the seedlings would lean towards the air pockets and travel underground, or the roots would hit the dry air pockets which would cause dehydration of the plant which, in turn, would kill the plant.

The present invention is directed towards overcoming the above mentioned and other problems relating to sod seeders. Therefore, one of the objects of the present invention is to provide an improved and highly efficient sod seeder.

A further object is to provide in such a sod seeder an improved coulter means which cuts the soil in such a manner that the air pockets are eliminated.

A further object is to provide in such a sod seeder a unique arrangement of parts which performs the following operations:

(1) Makes a zig-zag cut in the sod by means of a unique coulter;
(2) Cuts and lifts the soil behind the coulter to establish a trench;
(3) Throws the sod back to form a groove or band in the sod;
(4) Introduces the fertilizer into the trench;
(5) Pulverizes and packs the soil left in the groove;
(6) Deposits the seed onto the pulverized soil; and
(7) Presses the seed into the pulverized soil.

The means by which the foregoing and other objects of the present invention are accomplished and the manner of their accomplishment will be readily understood from the following specification upon reference to the accompanying drawings, in which:

FIG. 3 is a view partly in section and partly in elevation of a portion of the device of FIG. 1.

FIG. 4 is a sectional view taken as on the line IV—IV of FIG. 3.

FIG. 5 is an end view of the coulter of the present invention.

FIG. 6 is a fragmentary sectional view through the center of one of the bulged portions of the coulter.

FIG. 7 is an enlarged fragmentary sectional view taken as on the line VII—VII of FIG. 1.

FIG. 8 is an end view of the pulverizing and packing portion of the device of the present invention.

Figure 1:
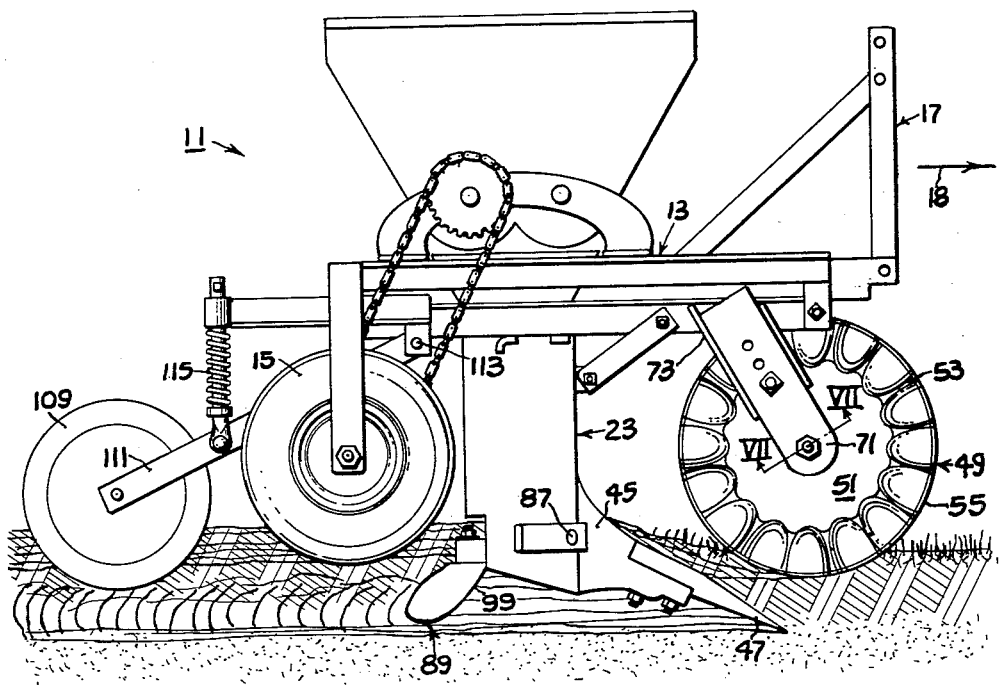
FIG. 1 is a side elevational view of the implement of the present invention shown in use.

Referring now to the drawings in which the various parts are indicated by numerals, the implement 11 of the present invention comprises, in general, a supporting frame 13 having a pair of ground engaging wheels 15. Only one of wheels 15 is shown in the drawings, since it will be understood the other wheel 15 is located in the usual manner on the other side of the implement from that shown in FIG. 1. Suitable means, such as bracket 17, is provided whereby the implement is adapted to be attached to a tractor or the like, not shown, and pulled in the direction indicated by the arrow at 18 in FIG. 1. The above description of the frame, wheels, etc. is deemed sufficient since they form no part of the present invention, but may be of any suitable construction, for example, like that shown in my Patent No. 2,739,549, issued March 27, 1956.

A suitable forward hopper 19 and a suitable rearward hopper 21 are carried by frame 13 for discharge of fertilizer and seed respectively into a boot 23 disposed therebelow. A plurality of boots 23 are preferably provided in spaced lateral alignment across implement 11 in a manner as shown in my said Patent No. 2,739,549, but only one of which is shown in the present drawings since all of the boots are substantially alike and the arrangement thereof may be determined by referring to my said patent. Suitable agitating means 25, 27 are respectively provided in hoppers 19, 21 and driven by a well-known manner to agitate the fertilizer and seed. Other details of construction of hoppers 19, 21 and the related parts thereof may be found by reference to my said patent.

Boot 23 is hollow and is preferably open adjacent its rearward edge, as at 29. Also, boot 23 is open at the top and bottom thereof, as best seen in FIG. 3. A partition 31 extending across the middle of boot 23 from adjacent the top to the bottom thereof divides the boot into a forward chute 33 and rearward chute 35. A pair of funnels 37, 39 are respectively disposed above chutes 33, 35 and adapted to respectively guide the fertilizer and seed which drop through the respective openings 41, 43 in the bottom of hoppers 19, 21. Boot 23 adjacent its lower end extends forwardly and downwardly for a portion, as at 45, and has removably attached thereto an incisor 47 in a manner similar to the implement of my heretofore mentioned patent.

The coulter 49 forms an important part of the present invention and takes the place of the previous disc type of coulter. It has been found that a disc type of coulter, which merely cuts the sod in a straight line, causes air pockets in the soil. These air pockets are formed since the air is trapped under the sod which falls back into place along the straight line previously made by the disc coulter. By the unique arrangement of parts and by the unique construction of parts, including coulter 49, to be hereinafter described, the implement 11 of the present invention completely eliminates any of these air pockets.

Coulter 49 comprises a flat and disc-like center portion 51 and a sinuous outer portion 53 integrally formed with the center portion. Outer portion 53 extends outwardly from center portion 51 and terminates in a sharpened sinuous edge 55, which is circular when viewed from the side, as in FIG. 1, and sinuous as viewed from the edge, as in FIG. 5. Thus, the sinuous outer portion 53 comprises a plurality of bulged portions 57, 59 which respectively and alternatingly extend to opposite sides of center portion 51. In other words, the bulged portions 57 extend to the left, as viewed in FIG. 5, and the bulged portions 59 extend to the right, as viewed in FIG. 5. Each of bulged portions 57, 59 includes a generally laterally extending arcuate portion 61 adjacent center portion 51, and thence from portion 61 the bulged portion extends outwardly, as at 62, to edge 55 so that the outwardly extending portion 62 is adapted to cut into the ground and the arcuate portion 61 is adapted to limit the depth at which the coulter 49 can cut into the ground. Center portion 51 is provided with a central opening 63 through which extends a hub 65 having a flange 67 which is fixedly attached to center portion 51, as by bolts 69 and nuts 70, or the like.

Coulter 49 is rotatably supported from frame 13, preferably by the following means:

A pair of legs 71, 72 are respectively adjustably attached to channel members 73, 74 by suitable means and respectively depend downwardly and forwardly therefrom. The channel members 73, 74, in turn, are fixedly attached to frame 13. At the lower end of legs 71, 73 a transverse bolt 75 extends through aligned apertures 77, 78 in legs 71, 72, and is held thereon by a nut 76. A cylindrical spacer 79 is carried by bolt 75 and extends between legs 71, 72. Hub 65 is rotatably mounted on spacer 79.

Figure 2:
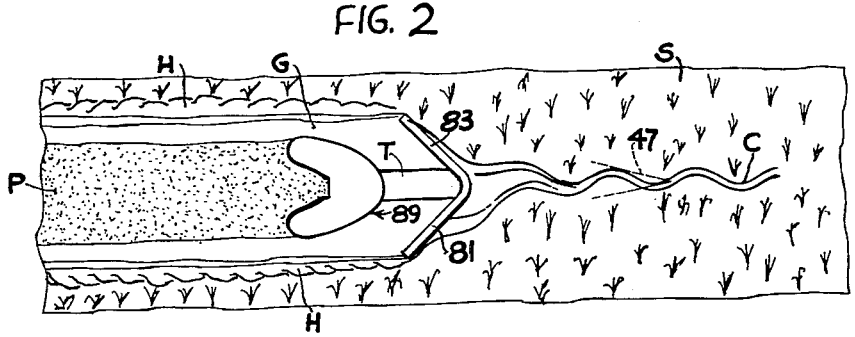
FIG. 2 is a somewhat schematic plan view illustrating the operations of the implement upon the sod and soil.

A pair of wings 81, 83 are carried by boot 23 spaced rearwardly from coulter 49. Wings 81, 83 extend outwardly and rearwardly from opposite sides of boot 23 and are adapted to spread the sod apart along the sinuous line C cut by coulter 49 and adapted to throw the sod back, as at H, to either side, as best shown in FIG. 2. Wings 81, 83 are preferably joined together adjacent the inner ends thereof and are preferably mounted on boot 23 by providing a slot 85 transversely through boot 23 which receives wings 81, 83 adjacent the juncture thereof and are held in place as by means of triangular shaped blocks 86. Screws 87 respectively extend through apertures in wings 81, 83 and are threaded into blocks 86 to hold the blocks in place, which prevents the wings from turning from side to side.

A pulverizing and packing device 89 is carried by boot 23 adjacent the lower end thereof and rearwardly of forward chute 33. Device 89 comprises a pair of arcuate blades 91, 93 respectively extending on opposite sides of boot 23 and joined together along a mid-portion 95. Each of blades 91, 93 extends rearwardly and downwardly from boot 23 in an arcuate path. Each of the blades are concave on the inner side thereof, as shown at 97 in FIG. 3 for the blade 93. The leading edges 99, 101 of the blades 91, 93 respectively extend downwardly and rearwardly in an arcuate path. The above described shape of device 89 causes the soil to be pulled in from the sides of the terench T in which it moves so that the soil is pulverized and then packed as it passes beneath the blades 91, 93. The actual means of attaching device 89 to boot 23 is preferably by means of a bolt 103 extending upwardly through an aperture in mid-portion 95 and anchored to a U-shaped bracket 105 by a nut 107, with the bracket 105 being fixedly attached to boot 23 by suitable means, as welding or the like.

A packing wheel 109 is yieldingly supported from frame 13 rearwardly of boot 23 by suitable means, as an arm 111. Wheel 109 is rotatably mounted adjacent one end of arm 111 by suitable means, and the other end of arm 111 is pivotally mounted from frame 13, as at pivot point 113, by suitable means. Suitable well-known resilient means, as at 115, is provided for yieldingly urging arm 111 and packing wheel 109 downwardly.

When implement 11 is pulled over the sod to be seeded, the sequence of operations is substantially as follows:

Coulter 49 makes a sinuous cut C in the sod S. It will be understood, of course, that coulter 49 rotates like a wheel as the implement 11 is pulled along the ground. Incisor 47 establishes a narrow trench T and lifts the soil somewhat as the incisor is pulled through the ground. As it lifts the soil, it also spreads sod S apart to some degree along the cut C and forwardly of wings 81, 83. Then, when sod S is contacted by wings 81, 83, the wings further spread the sod and throw it back to either side, as at H. This forms a band or groove G in the ground which is of a width substantially equal to the lateral distance from the rearward tips of wings 81, 83 and of a depth substantially equal to the vertical dimension of the wings. The fertilizer falls downwardly through forward chute 33 into groove G. The device 89, which is at a lower level than groove G, more or less shaves the hard soil off the sides of trench T, draws it in towards the center of groove G, pulverizes the soil, as at P, and packs it over the fertilizer. Thus, a bed is prepared for the seeds which are dropped downwardly from hopper 21 through rearward chute 35 and are deflected rearwardly of device 89 onto the bed by the rearwardly and downwardly curved deflector 117 which is fixedly attached to partition 31 by suitable means. The seeds are then pressed into the soil by means of the wheel 109.

From the foregoing it will be understood that a very unique and efficient implement is provided for preparing the soil, fertilizing and planting the seed in an existing sod without prior preparation. In addition, it will be understood that air pockets in the soil are eliminated due to the unique construction and arrangement of the parts of implement 11, particularly the coulter 49, wings 81, 83, device 89, and their relationship to each other and to boot 23.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In an agricultural implement of the type described, in combination, a main frame supported for movement over the ground, a coulter comprising a center portion and a ground engaging outer portion including a plurality of bulged portions alternatingly extending towards and away from opposite sides of said coulter, said bulged portions being fewer in number than thirty, said outer portion having a sharpened outer edge adapted to make a sinuous cut in the ground, each of said bulged portions including an arcuate portion extending generally laterally of said couter for a substantial distance for limiting the depth to which said coulter can cut into the ground, each of said bulged portions additionally including a portion adjacent the center of each of said bulged portions extending outwardly from said arcuate portion to said outer edge in substantially parallel spaced relationship to said center portion of said coulter for a substantial distance, means rotatably supporting said coulter from said frame adjacent the forward part of said implement, a hollow trench-forming boot mounted on said frame rearwardly of said coulter, means establishing a forward chute and a rearward chute in said boot for respectively conducting material and seeds downwardly therethrough, a pair of wings mounted on said boot rearwardly of said coulter, said wings having lower edges extending substantially straight and horizontally, said wings extending rearwardly and outwardly from opposite sides of said boot, said wings being positioned to spread the sod apart along the sinuous cut made by said coulter to establish a shallow groove, a pulverizing and packing device carried by said boot adjacent the lower end thereof and rearwardly of said forward chute, said device being more than three times wider than said boot, said device comprising a pair of blades extending rearwardly and downwardly from said boot in an arcuate path and on opposite sides of said boot, each of said blades being concave on the inner side thereof and having a leading edge extending downwardly and rearwardly in an arcuate path whereby as said device moves along it is adapted to pull the soil in from the sides of the trench formed by said boot so that the soil is pulverized and then packed as it passes beneath said blades, means mounted on said boot for deflecting the seeds from said rearward chute rearwardly of said device onto the pulverized and packed soil, supporting means attached to said main frame, and packing wheel means supported by said supporting means in a position rearwardly of said device for pressing the seeds from said rearward chute into said pulverized and packed soil.

2. In an agricultural implement of the type described, in combination, a main frame supported for movement over the ground, a coulter comprising a center portion and a ground engaging outer portion including a plurality of bulged portions alternatingly extending towards and away from opposite sides of said coulter, said center portion having opposite faces lying in parallel and spaced substantially vertical planes, said outer portion having a sharpened sinuous outer edge adapted to make a sinuous cut in the ground, each of said bulged portions including an arcuate portion extending generally laterally of said center portion for a substantial distance beyond the confines defined between said planes of said opposite faces of said center portion for limiting the depth to which said coulter can cut into the ground, each of said bulged portions additionally including a portion adjacent the center of each of said bulged portions extending outwardly from said arcuate portion to said outer edge in substantially parallel spaced relationship to said center portion of said coulter for a substantial distance, means rotatably supporting said coulter from said frame adjacent the forward part of said implement, a hollow trench-forming boot mounted on said frame rearwardly of said coulter, means establishing a forward chute and a rearward chute in said boot for respectively conducting material and seeds downwardly therethrough, a pulverizing and packing device carried by said boot adjacent the lower end thereof and rearwardly of said forward chute, said device comprising a pair of blades extending rearwardly and downwardly from said boot in an arcuate path and on opposite sides of said boot, each of said blades being concave on the inner side thereof and having a leading edge extending downwardly and rearwardly in an arcuate path whereby as said device moves along it is adapted to pull the soil in from the sides of the trench formed by said boot so that the soil is pulverized and then packed as it passes beneath said blades, means mounted on said boot for deflecting the seeds from said rearward chute rearwardly of said device onto the pulverized and packed soil, supporting means attached to said main frame, and packing wheel means supported by said supporting means in a position rearwardly of said device for pressing the seeds from said rearward chute into said pulverized and packed soil.

3. In an agricultural implement of the type described, in combination, a main frame supported for movement over the ground, a coulter comprising a center portion and a sharpened sinuous outer edge, said center portion having opposite faces lying in parallel and spaced substantially vertical planes, said sinuous outer edge extending alternately on opposite sides of said coulter a substantial distance laterally of said coulter beyond the confines defined between said planes of said opposite faces of said center portion for making a sinuous cut in the ground, portions of said coulter between said outer edge and said center portion extending parallel to said center portion for a substantial distance, means rotatably supporting said coulter from said frame adjacent the forward part of said implement, means mounted on said frame for forming a trench in said ground rearwardly of said coulter, a pulverizing and packing device, means supporting said device rearwardly of said coulter, said device comprising a pair of blades extending rearwardly and downwardly from said supporting means in an arcuate path and on opposite sides of said supporting means, each of said blades being concave on the inner side thereof and having a leading edge extending downwardly and rearwardly in an arcuate path whereby said device is adapted to pull the soil in from the sides of said trench so that the soil is pulverized and then packed as it passes beneath said blades, and means carried by said frame for depositing seeds rearwardly of said device onto the pulverized and packed soil.

4. In an agricultural implement for the placement of fertilizer and planting of seeds in existing sodded ground without previous preparation comprising, in combination, a main frame supported for movement over the sodded ground, coulter means supported by said frame adjacent the forward part of said implement for making in the sodded ground a cut of zig-zag configuration having a substantial amplitude, boot means supported by said frame for digging and lifting the sodded ground behind said coulter frame to establish a trench, wing means supported by said boot means behind said coulter means in position for throwing the sod back to establish a shallow groove in the sodded ground, said wing means having lower edges extending substantially straight and horizontally, means carried by said frame for introducing the fertilizer into said trench, means carried by said boot adjacent the rearward part of said boot and below said wing means in position for pulling the soil inwardly from the sides of said trench to pulverize and pack the soil over the fertilizer, means carried by said frame for introducing the seed onto the pulverized and packed soil, means carried by said frame in position for pressing the seed into said pulverized and packed soil, said coulter means comprising a center portion having opposite faces lying in parallel and spaced substantially vertical planes and a ground engaging outer portion including a plurality of bulged portions alternatingly extending towards and away from opposite sides of said center portion, said outer portion having a sharpened outer edge adapted to make a sinuous cut in the ground, each of said bulged portions including an arcuate portion extending generally laterally of said center portion for a substantial distance beyond the confines defined between said planes of said opposite faces of said center portion for limiting the depth to which said coulter means can cut into the ground, and each of said bulged portions additionally including a portion adjacent the center of each of said bulged portions extending outwardly from said arcuate portion to said outer edge in substantially parallel spaced relationship to said center portion of said coulter for a substantial distance.

5. The structure according to claim 4 in which said means for pulling the soil inwardly from the sides of said trench comprises a pair of rearwardly and downwardly extending blades, each of said blades being concave on the inner side thereof and having a leading edge extending downwardly and rearwardly in an arcuate path.

6. The structure according to claim 4 in which the number of said bulged portions is less than thirty.

References Cited in the file of this patent

UNITED STATES PATENTS

| | | |
|---|---|---|
| 335,954 | Pedrick | Feb. 9, 1886 |
| 809,883 | Avery | Jan. 9, 1906 |
| 1,030,244 | Payne | June 18, 1912 |
| 1,311,427 | Tulloss | July 29, 1919 |
| 1,823,244 | White | Sept. 15, 1931 |
| 1,908,255 | Kaupke | May 9, 1933 |
| 2,514,890 | McLemore | July 11, 1950 |
| 2,739,549 | Taylor | Mar. 27, 1956 |
| 2,842,899 | Padrick | July 15, 1958 |
| 2,849,969 | Taylor | Sept. 2, 1958 |
| 2,908,338 | Hanrahan | Oct. 13, 1959 |

FOREIGN PATENTS

| | | |
|---|---|---|
| 590,435 | Great Britain | July 17, 1947 |